No. 826,338.
PATENTED JULY 17, 1906.
J. H. KRESSLER.
WHEEL TIRE.
APPLICATION FILED JULY 19, 1905.
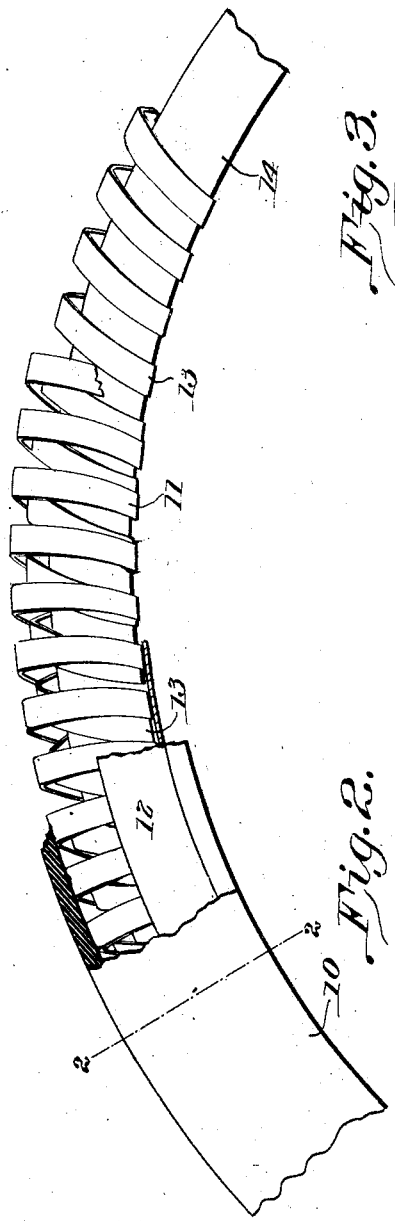
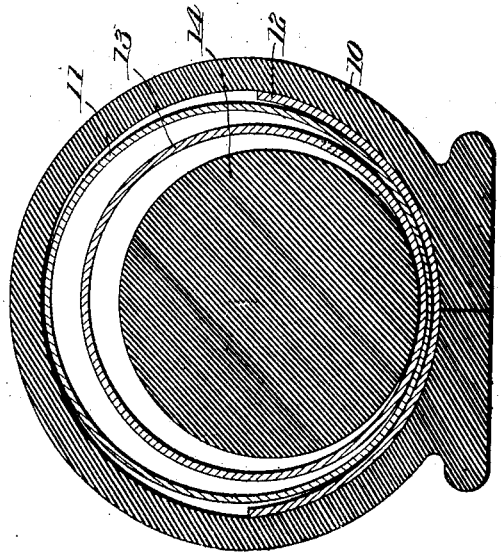
Witnesses
John H. Kressler,
Inventor,
by
Attorneys

UNITED STATES PATENT OFFICE.

JOHN H. KRESSLER, OF BETHLEHEM, PENNSYLVANIA.

WHEEL-TIRE.

No. 826,338.

Specification of Letters Patent.

Patented July 17, 1906.

Application filed July 19, 1905. Serial No. 270,400.

*To all whom it may concern:*

Be it known that I, JOHN H. KRESSLER, a citizen of the United States, residing at Bethlehem, in the county of Northampton and State of Pennsylvania, have invented a new and useful Wheel-Tire, of which the following is a specification.

This invention relates to tires, and especially to that class of tires known as "cushion-tires," and has for its object to provide a tire embodying new and improved features of resiliency, durability, and reliability.

A further object of the invention is to provide a cushion-tire capable of responding to varying degrees of pressure and impact.

A further object of the invention is to provide a core for use within an outer casing by the use of which an outer casing of the construction usually employed upon pneumatic tires may be converted into a cushion or spring tire.

A further object of the invention is to provide a core for an outer tire-casing comprising a helical spring internally filling the casing, in which is another and smaller helical spring, and within that again a third and smaller helical spring or a ring of rubber or other elastic material.

With these and other objects in view the present invention consists in the combination and arrangement of parts, as will be hereinafter fully described, shown in the accompanying drawings, and particularly pointed out in the appended claims, it being understood that changes in the form, proportion, size, and minor details may be made without departing from the spirit or sacrificing any of its advantages.

In the drawings, Figure 1 is a view of the tire in side elevation with portions broken away. Fig. 2 is a transverse sectional view of the improved tire, taken on line 2 2 of Fig. 1. Fig. 3 is a transverse sectional view of a form wherein the elastic ring shown in Figs. 1 and 2 is replaced by an additional helical spring.

Like characters of reference indicate corresponding parts in all of the figures of the drawings.

The improved tire forming the subject-matter of this application comprises an outer casing of any approved and usual form and here shown as the "clencher" 10. Within the casing 10 is mounted a core comprising a spring 11, composed of a flat strip of spring material coiled in the form of a helix and to substantially fill the casing. To provide for inequalities in the diameter of the casing, a guard 12 is provided arranged to be compressed within the casing and by its expansion to hold the casing firmly upon the spring. The guard 12 also serves to prevent the casing and spring from expanding over the rim to a degree sufficient to break the parts.

Within the helical spring 11 is mounted a second spring 13, also coiled as a helix, but smaller than spring 11 and of a reverse wind, so that the coils of the two springs cross at each convolution. The spring 13 being under tension is held in contact with the inner side of the spring 11 and transversely eccentric thereto. Within the spring 13 is mounted a ring 14, of rubber or other elastic material, which being also under tension is held in contact with the inner side of and eccentric to spring 13. Instead of the elastic ring 14 a heavy helical spring 15 may be substituted and reinforced, if desired, by a guard 16, disposed between the springs 13 and 15. The spring 15 being under tension is held likewise in contact with the inner side of and eccentric to the spring 13 with the guard 16 clamped firmly therebetween.

It will be readily seen that a light or ordinary load will be supported upon the spring 11, which being of spring material is resilient, thus carrying the vehicle smoothly and evenly. With a heavy load the spring 11 is compressed until it comes into contact with the spring 13, when the vehicle is supported by the resiliency of both springs. Should the tire strike a curb or other obstruction, the springs 11 and 13 will be together compressed until they contact with ring 14 or inner spring 15, which will receive and cushion the force of the impact, thus saving from damage the wheel, vehicle, and occupants.

Having thus described the invention, what is claimed is—

1. A tire comprising a flexible casing, a yielding core approximately filling the casing and a guard-plate between the core and casing and arranged to stretch the casing tightly upon the core.

2. A tire comprising a flexible casing, a yielding core approximately filling the casing and a curved guard-plate between the core and casing and arranged to stretch the casing tightly upon the core.

3. A tire embodying a flexible casing, a core comprising a helical spring approximately filling the casing and means between the core and casing to stretch the casing tightly upon the core.

4. A tire embodying a flexible casing, a helical spring within and approximately filling the casing, a yielding ring within the spring and means between the ring and spring to support the ring under impact.

5. A tire embodying a flexible casing, a helical spring within and approximately filling the casing, a yielding ring disposed eccentrically within the spring and a segmental supporting-plate between and eccentric to the ring and spring.

6. A tire embodying a flexible casing, a helical spring within and approximately filling the casing, means between the spring and casing to stretch the casing tightly upon the spring, a yielding ring within and concentric to the spring and a segmental supporting-plate between and eccentric to the ring and spring.

7. A tire embodying a flexible casing, a helical spring within and approximately filling the casing, a segmental plate between the spring and casing and arranged to support the spring under compression, a yielding ring within and concentric to the spring and a segmental supporting-plate between and eccentric to the ring and spring.

8. A tire embodying a flexible casing, a helical spring within the casing, a helical spring of smaller diameter and reverse wind within and eccentric to the outer spring, a yieldable core eccentrically within the inner spring, and a segmental supporting-plate between and eccentric to the ring and spring.

9. In a tire a casing, a removable inner core comprising a helical spring substantially filling the casing, a helical spring of smaller transverse diameter and reverse wind mounted eccentrically within the outer spring, an elastic ring mounted eccentrically within the inner spring, a guard-plate mounted between the outer spring and the casing and arranged to stretch the casing tightly upon the core, and the spring, guard and ring contacting at their inner side.

In testimony that I claim the foregoing as my own I have hereto affixed my signature in the presence of two witnesses.

JOHN H. KRESSLER.

Witnesses:
UIAH YOUNG,
C. J. GANGEWERE.